US006286374B1

United States Patent
Kudo et al.

(12) United States Patent
(10) Patent No.: US 6,286,374 B1
(45) Date of Patent: Sep. 11, 2001

(54) PRELOAD MEASURING APPARATUS OF ROLLING BEARING

(75) Inventors: Hiroyuki Kudo; Takashi Maeda; Nobuo Iwatani; Hiroshi Shibazaki, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/437,901

(22) Filed: Nov. 9, 1999

(30) Foreign Application Priority Data

Nov. 9, 1998 (JP) .................................................. 10-317837

(51) Int. Cl.⁷ ........................................................ G01L 1/10
(52) U.S. Cl. ........................................... 73/862.59; 73/581
(58) Field of Search ............................. 73/862.59, 862.01, 73/579, 581

(56) References Cited

U.S. PATENT DOCUMENTS 4,957,412 * 9/1990 Olson et al. ........................... 415/189
5,421,088 * 6/1995 Kawamura ........................ 29/898.062
5,877,433 * 3/1999 Matsuzaki et al. ............... 73/862.381

* cited by examiner

Primary Examiner—Max Noori
(74) Attorney, Agent, or Firm—Sughrue, Mion, Zinn, Macpeak & Seas, PLLC

(57) ABSTRACT

A preload measuring apparatus to measure the preload of a rolling bearing that includes a bearing support, a pressurization device, an excitation device, a vibration sensor, and a control section. The bearing support supports a rolling bearing by supporting both ends of a shaft inserted into an inner ring of the rolling bearing. The pressurization device loads a predetermined weight in the axial direction onto the rolling bearing. The excitation device applies vibration onto the rolling bearing by the drive of the piezoelectric elements. The vibration sensor detects the vibration generated on the rolling bearing by the vibration application of the excitation device. The control section operates the excitation device in the situation that the pressurization device presses the rolling bearing, and obtains the resonance frequency by the output signal from the vibration sensor and calculates the preload of the rolling bearing according to the obtained resonance frequency before the predetermined weight as loaded.

14 Claims, 8 Drawing Sheets

PRELOAD MEASURING APPARATUS OF ROLLING BEARING

BACKGROUND OF THE INVENTION

The present invention relates to a preload measuring apparatus of a rolling bearing which is assembled into each type of precision rotational portions such as a spindle motor, rotary actuator, rotary encoder, or the like, of a video tape recorder (VTR), hard disk drive (HDD), laser beam printer (LBP), or similar device.

A rolling bearing which is assembled into a precision rotational portion such as a spindle motor, rotary actuator, rotary encoder, or the like, used in a VTR, HDD, LBP, or similar device, is required to be very accurately produced to prevent a whirling motion and a deflection in the axial direction. Accordingly, a rolling bearing to support the spindle is used under the condition that a preload in the axial direction is applied. By applying the preload, the rigidity of the bearing is kept high, the deflection accuracy of the shaft is increased, and the slippage of a ball at the high speed rotation is prevented.

As such the rolling bearing to support the spindle of the VTR, HDD, LBP, or the like, there are following rolling bearings: for example, as shown in FIG. 11(a), a pair of respectively independent rolling bearings assembled onto a rotation shaft by press fitting or adhesion; as shown in FIG. 11(b), a rolling bearing which has double-row raceways in the outer ring, and to which the preload is applied by press fitting or adhering the divided inner ring to be moveable in the axial direction; or as shown in FIG. 11(c), a rolling bearing which has double-row raceways in the inner ring and the outer ring respectively, and to which the preload is applied at assembling by changing the dimension of the pitch of the raceway.

In the other words, in the rolling bearing shown in FIG. 11(a), an inner race member thereof comprises a shaft and two inner rings attached to the shaft, and an outer race member thereof comprises two outer rings which are respectively mated with the inner rings. In the rolling bearing shown in FIG. 11(b), an inner race member comprises a shaft and two inner rings attached to the shaft, and an outer race member thereof comprises a common outer ring having two raceways which are respectively mated with the two inner rings. In the rolling bearing shown in FIG. 11(c), an inner race member thereof comprises a shaft having two raceways, and an outer race member thereof comprises an outer ring having two raceways which are respectively mated with the two raceways of the shaft.

However, in any method of the above description, it is difficult to measure the preload after the assembling of the rolling bearing, because the preload is different according to the positional dimension of each member.

Accordingly, for example, Japanese Patent Examined Publication No. Hei. 2-61100 disclose a preload measuring method wherein the resonance frequency of the bearing apparatus itself is obtained by applying a minute vibration onto the rolling bearing, and this resonance frequency is converted into the preload by using a constant relationship between the resonance frequency of the rolling bearing and the preload.

However, in such the preload measuring method, there is still a problem which will be described below. That is, noise vibration is generated due to a disturbance of the mechanical system when a minute vibration is applied onto the rolling bearing, and therefore the preload can not be accurately measured due to this noise vibration.

Further, as the rolling bearing becomes small and then the mass of the outer ring becomes small, the resonance frequency of the rolling bearing appears on the high frequency side. As shown in FIG. 7, the vibration peak appears, for example, near 20 kHz at which the noise is relatively strong. At that time the resonance frequency is covered with the noise, so that it becomes difficult to detect the resonance frequency. Accordingly, the accuracy of the measurement is lowered, and the rigidity or the preload of the rolling bearing which are calculated, becomes incorrect.

SUMMARY OF THE INVENTION

The present invention is made to solve such the conventional problems, and an object of the present invention is to provide a preload measuring apparatus of a rolling bearing which can accurately measure the preload working on the rolling bearing by preventing the influence due to vibration of the disturbance.

The above-mentioned object can be achieved by a preload measuring apparatus for measuring a preload of a rolling bearing which includes an inner race member, an outer race member, and a plurality of rolling elements rotatably interposed between the inner race member and the outer race member, the preload measuring apparatus, according to the present invention comprising a bearing support member, a pressurization member, an excitation member, a vibration sensor and a controller. The bearing support member supports both ends of the inner race member in the axial direction of the rolling bearing. The pressurization member loads a predetermined weight to one of the both ends of the inner race member in the axial direction through the bearing support member. The excitation member applies vibration to the inner race member in the axial direction while the predetermined weight is loaded on the inner race member the pressurization member. The vibration sensor detects a vibration which is generated on the outer race member and is caused by the vibration of the inner race member. The controller is capable of calculating a resonance frequency of the rolling bearing through an output signal of the vibration sensor and also calculating a true preload of the rolling bearing in accordance with the thus calculated resonance frequency, the true preload defining a preload of the rolling bearing before the predetermined weight is loaded on the inner race member.

In the above-mentioned preload measuring apparatus according to the present invention, it is preferable that the inner race member comprises an inner ring and a shaft rigidly secured to the inner ring, and the bearing support supports both ends of the shaft in the axial direction.

In the above-mentioned preload measuring apparatus according to the present invention, it is preferable that the inner race member comprises an inner ring and a shaft rigidly secured to the inner ring, and the bearing support member supports one end of the shaft in the axial direction and one end surface of the inner ring in the axial direction.

In the above-mentioned preload measuring apparatus according to the present invention, it is preferable that the inner race member comprises a shaft having a raceway on its peripheral surface.

In the above-mentioned preload measuring apparatus according to the present invention, it is preferable to further comprises a pressurization detect member detecting a pressure of the inner race member which is loaded by the pressurization means, wherein when an output of the pressurization detect member reaches a predetermined value, the excitation means begins to apply the vibration to the inner race member.

In the above-mentioned preload measuring apparatus according to the present invention, it is preferable that the excitation member comprises at least two piezoelectric elements applying vibration to the inner race member while loading the predetermined weight on the inner race member in the axial direction, the piezoelectric elements having reverse phases and the same amplitudes each other.

In the above-mentioned preload measuring apparatus according to the present invention, it is preferable to further comprises a weight member attached to the outer race member, wherein the vibration sensor detects the vibration of outer race member through the weight member.

In the above-mentioned preload measuring apparatus according to the present invention, it is preferable that the loading operation of the pressurization member is stopped when a resonance frequency output from the vibration sensor coincides with a predetermined frequency.

In addition, the above object can be attained by a preload measuring apparatus, according to the present invention, to measure a preload of the rolling bearing comprises a bearing support member for supporting a rolling bearing by supporting both ends of a shaft inserted into an inner ring of the rolling bearing to be measured, a pressurization member for loading a predetermined weight in the axial direction onto the rolling bearing, an excitation member for applying vibration onto the rolling bearing by the drive of a piezoelectric element, a vibration sensor to detect a vibration generated on the rolling bearing by the vibration application of the excitation member, and a control section wherein the excitation member is operated under the condition that the pressurization member presses the rolling bearing, the resonance frequency is obtained from an output signal from the vibration sensor, and the preload of the rolling bearing before the predetermined weight is loaded, is calculated according to the obtained resonance frequency.

In the preload measuring apparatus of the rolling bearing, the vibration can be detected while noise components are being removed because a predetermined weight is loaded onto the bearing by the pressurization member, therefore, the resonance frequency of the rolling bearing can be accurately obtained. As a result, a true preload of the rolling bearing can be accurately obtained by conversion processing. Further, the measurement of the preload can be quickly carried out by the continuous automatic control, and high productivity measurement can be carried out.

It is preferable that, in the calculation of the preload, the true resonance frequency $f_a$ is obtained from a predetermined weight F2 value, the resonance frequency $f_M$ when the weight F2 is loaded, and a correction factor K. Then a preload $F_a$ is obtained from the true resonance frequency $f_a$ and an contact angle α of the bearing.

Further, it may be allowed that a weight member is fixed to the outer ring of the rolling bearing, and a probe of the vibration sensor is contacted with a portion of the weight member to detect the vibration.

According to this, even when the size of the bearing becomes small and then the rigidity and the mass of the bearing becomes small, the vibration peak of the resonance frequency can be detected without being covered with noises. Accordingly, the preload of the rolling bearing can be accurately obtained.

Further, as a production method of the rolling bearing using the preload measuring apparatus of the rolling bearing, in the case where a rolling bearing applied preload is produced, the rolling bearing comprising the first member having the first peripheral surface, the second member arranged concentrically with the first member and having the second peripheral surface opposite to the first peripheral surface, the first raceway formed on the first peripheral surface, the second raceway formed on the portion opposite to the first raceway of a portion of the second peripheral surface, the third raceway formed on a portion shifted from the second raceway in the axial direction of the second peripheral surface, the third member which is supported by the first member with sufficient engagement strength and supported concentrically with the first and second member, and has the third peripheral surface opposite to the second peripheral surface, the fourth raceway which is formed on the portion opposite to the third raceway of a portion of the third peripheral surface, and each plurality of balls which are respectively provided between the first raceway and the second raceway, and between the third raceway and the fourth raceway, wherein an appropriate preload is applied onto the each plurality of balls by adjusting the engagement depth of the third member to the first member, each plurality of balls are respectively inserted between the first raceway and the second raceway, and the third raceway and the fourth raceway, then the third member is forced to move in the axial direction to the first member, in the situation that the engagement depth is shifted from the length necessary for appropriate preload application and thus preload application can not be conducted on the ball, and the preload is applied to make the engagement depth to be the length necessary for appropriate preload. The production method of the rolling bearing applied preload comprises that an piezoelectric element having the sufficient rigidity to the strength in axial direction is arranged in series with the third member and the member which forces to move the third member in the axial direction, each component of the rolling bearing is vibrated according to the current flowing into the piezoelectric element while the resonance frequency of the rolling bearing is being measured, the third member is press fitted to the first member, and the press fitting operation onto the third member is completed in the situation that the resonance frequency almost coincides with the predetermined frequency. The production method of the rolling bearing can be allowed that the mass is increased by attaching the weight member to the second member.

According to the production method of the rolling bearing, the third member and the first member into which the third member is press fitted, can be vibrated with the small vibration energy, and the vibration level of the resonance frequency of the rolling bearing apparatus can be raised. As the result, the engagement depth of the third member to the first member can be exactly regulated with the small energy consumption.

DETAILED DESCRIPTION OF PREFERRED EMBODIMENTS

Figure 1:
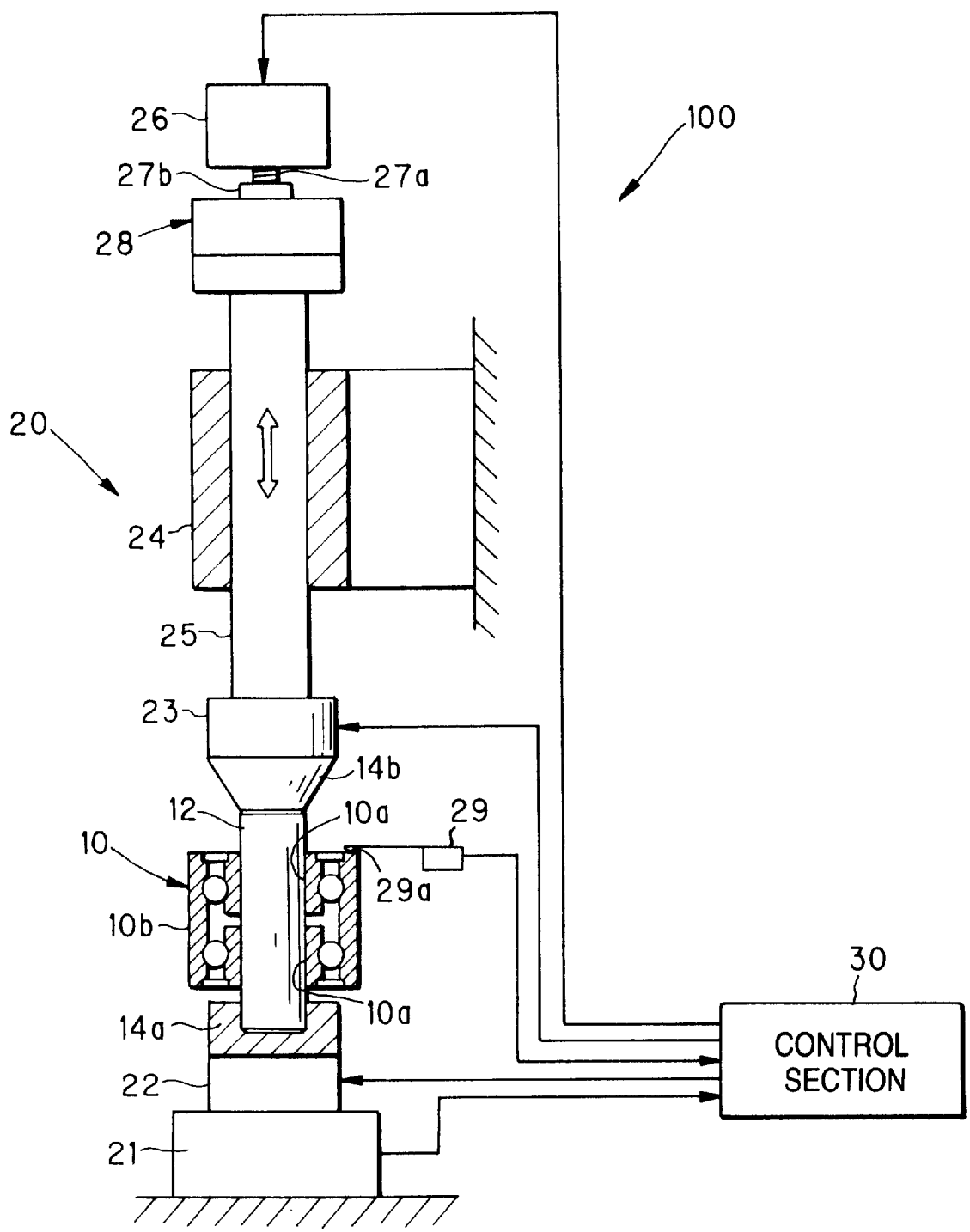
FIG. 1 is an illustration showing a first embodiment of an overall structure of a preload measuring apparatus according to the present invention.

Hereinafter, preferable embodiments of a preload measuring apparatus of a rolling bearing according to the present invention will be detailed, referring to the drawings.

Figure 2:
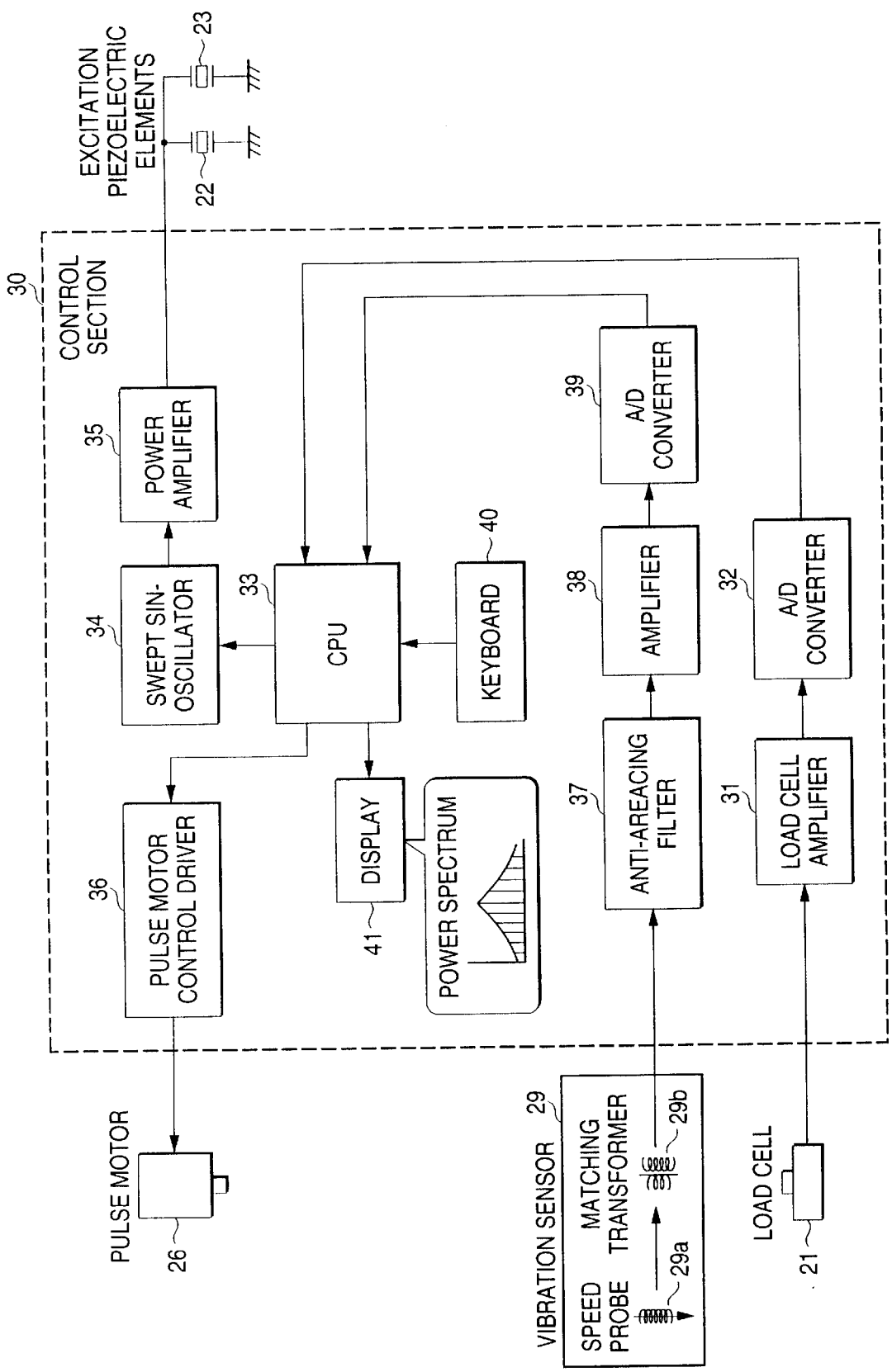
FIG. 2 is a block diagram showing a structure of a control section of the preload measuring apparatus.

FIG. 1 shows an overall structure in a first embodiment of the preload measuring apparatus of the rolling bearing according to the present invention. FIG. 2 is a block diagram showing a concrete structure of a control section of the preload measuring apparatus.

Initially, as shown in FIG. 1, a preload measuring apparatus 100 of the present embodiment comprises, mainly, a measuring apparatus main body 20 and a control section 30. In the main body 20, one end of the shaft 12 is inserted and fixed in a recessed portion of a receiving side tool 14a and the other end is set to be able to contact with a pressing side tool 14b under the condition that a shaft 12 is inserted into an inner ring 10a side of the rolling bearing 10 which is a measuring object. The control section 30 is connected to the measuring apparatus main body 20 and controls the input/output data to the measuring apparatus main body 20. The receiving side tool 14a and the pressing side tool 14b correspond to a shaft supporting means.

Figure 11A:
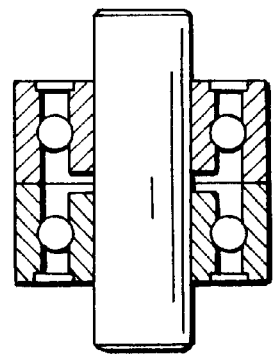
FIGS. 11(a) to 11(c) sectional views of the rolling bearings explaining conventional various preload loading methods.
Figure 11B:
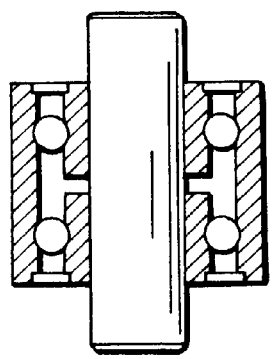
Figure 11C:
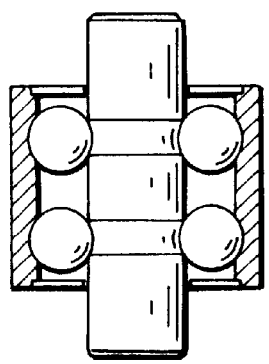

Herein, the rolling bearing which is a measuring object, is one of a type shown in FIG. 11(b), which is divided into 2 portions on the axial line. The rolling bearing has inner ring 10a, 10a having raceways on the outer periphery side. The rolling bearing also has an outer ring 10b which is provided on the outer peripheral side of the inner ring, and has double-row raceways on the inner peripheral surface of the outer ring opposite to the raceways of the inner ring. However, any one of other types may be applied.

The measuring apparatus main body 20 comprises, from its lower portion in order, a load cell 21 fixed on a base board, a lower piezoelectric element 22 fixed on the load cell 21, a receiving side tool 14a which is fixed on the lower piezoelectric element 22 and supports the lower end of the shaft 12, a pressing side tool 14b pressing the upper end of the shaft 12, an upper piezoelectric element 23 fixed on the pressing side tool 14b, a feed shaft 25, and a coupling section 28. One end of the feed shaf 25 is connected to the upper piezoelectric element 23 and the feed shaft 25 is supported so that it can move in the arrowed direction (vertical direction) shown in FIG. 1 by a guide holder 24. The coupling section 28 is connected to the other end of the feed shaft 25 and is driven through a ball screw 27a and a nut 27b by the rotation of a pulse motor 26 for feeding and pressurizing. Further, the measuring apparatus main body 20 comprises a vibration sensor 29 which detects a vibration by contacting a probe 29a, for example, with the end surface of the outer ring 10b of the rolling bearing 10.

Then, the load cell 21, the lower piezoelectric element 22, the upper piezoelectric element 23, the pulse motor 26, and the vibration sensor 29 are connected to the control section 30, and input/output of each data of them is conducted.

Incidentally, the pulse motor 26 corresponds to the pressurization means, and piezoelectric elements 22 and 23 correspond to the excitation means.

The load cell 21 detects the weight loaded in the axial direction of the rolling bearing 10 in real time. As shown in FIG. 2, the output signal from the load cell 21 is amplified by a load cell amplifier 31, and successively transferred to a central processing unit (CPU) 33 through an A/D converter 32.

The lower and upper piezoelectric elements 22 and 23 excite the rolling bearing 10 held between the receiving side tool 14a and the pressing side tool 14b through the shaft 12. After a oscillation signal of a swept sin oscillator 34 is amplified by a power amplifier 35 by a command from the CPU 33, the amplified signal is inputted into the piezoelectric elements 22 and 23, and then the shaft 12 is excited. Incidentally, a swept sin wave (for example, its frequency is about 0–10 kHz) which is swept is appropriately used as the inputted oscillation signal.

These piezoelectric elements 22 and 23 have a sufficient rigidity in the axial direction of the rolling bearing. The pair of piezoelectric elements 22 and 23 are driven in opposite phases and at the same amplitudes each other. When one piezoelectric element is elongated, the other piezoelectric element is contracted by the same amount. That is why compression of the shaft 12 of the rolling bearing 10 by the both piezoelectric elements is prevented, and the rolling bearing 10 is made to assuredly vibrate in the axial direction.

When the pulse motor 26 for the feeding and pressurization is rotationally driven, the rotation is converted into the straight movement by the ball screw 27a and the nut 27b, and then the feed shaft 25 is moved. After the shaft 12 is moved to the contact position of the pressing side tool 14b, the shaft 12 is further pressed. By pressing the shaft 12, the shaft 12 is compressed, as the result, the preload is loaded onto the inner and outer rings of the rolling bearing 10. The pulse motor 26 is rotationally driven through a pulse motor control driver 36 which is operated by a command from the CPU 33.

The vibration sensor 29, for example, a moving magnet type vibration detection sensor, detects the resonance frequency of the rolling bearing 10. The vibration sensor 29 comprises the probe 29a to detect the vibration, and a matching transformer 29b which generates amplification effect by the pressure-up of voltage due to an increase of the impedance. The detection signal from the matching transformer 29b is inputted into low pass filter 37, and a high frequency component (for example, more than 15 kHz) is removed. This low pass filter 37 has an effect that the reflected frequency in the high frequency area is removed and the discrete frequency in the low frequency area is selected. Thus the low pass filter 37 functions as a kind of a low-pass filter. Further, the signal from the low pass filter 37 is transferred to the CPU 33 through an amplifier 38 and an A/D converter 39.

The CPU 33 reads a program based on a calculation method which will be described later, from an auxiliary memory apparatus (which is not shown) and controls each units. Then the CPU 33 reads the data obtained from each unit and calculates the preload of the rolling bearing 10. Concretely, each setting is conducted by an input operation from the attached key-board 40. While the CPU 33 drives the pulse motor 26, and the piezoelectric elements 22 and 23 through the interface, it successively reads the weight change data and the vibration data, conducts each processing and calculation, and displays the result on the display 41 attached to the control section 30.

Figure 3:
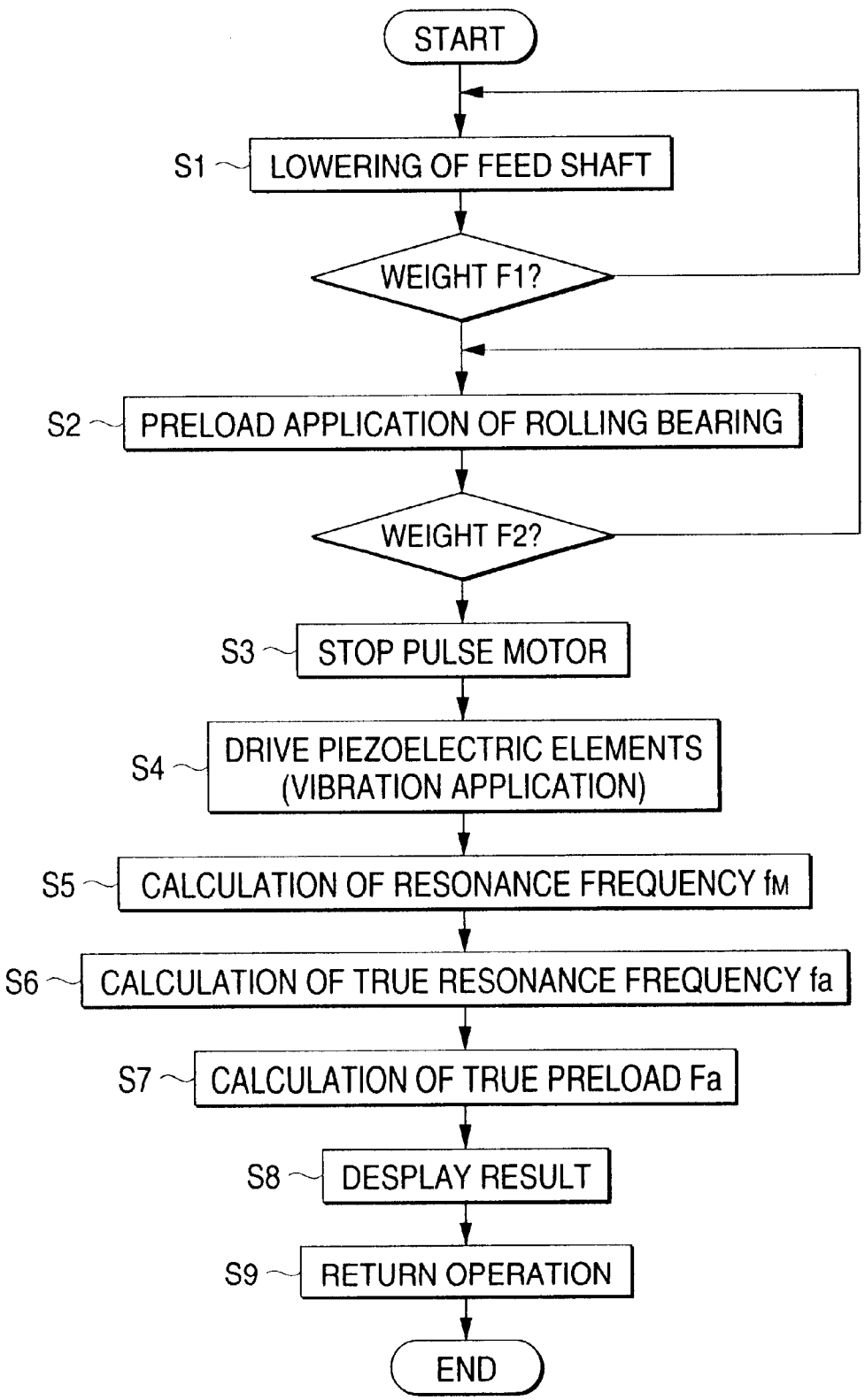
FIG. 3 is a flow chart showing a measuring process of the preload according to the preload measuring apparatus.

Next, according to a flow chart in FIG. 3, a process to measure the preload of the rolling bearing by the preload measuring apparatus will be described.

Initially, as shown in FIG. 1, after the bearing apparatus 10 is set between the receiving side tool 14a and the pressing side tool 14b, the control section 30 and each unit are started up by turning on the power supply to them, and the program is started by the operation of the key board 40. Then, the CPU 33 drives the pulse motor 28 so that the feed shaft 25 is lowered at a predetermined speed from standby position (step 1, hereinafter, abbreviated to S1). At that time, the weight loaded to the rolling bearing 10 is successively detected by the load cell 21.

When the output of the load cell 21 reaches a predetermined first setting weight F1 (for example, 5–10 kg), that is, the feed shaft is lowered and the pressing side tool 14b comes into contact with the shaft 12, the rotation speed of the pulse motor 26 is switched from the rapid feeding mode to the slow feeding mode. Further, as the pulse motor 26 is rotated in such the situation, the shaft 12 is pressed, and the weight is loaded onto the rolling bearing 10. This weight acts on the rolling bearing 10 as a preload (S2).

Then, when a second setting weight F2, that is, the output of the load cell 21 reaches a weight at which the preload is measured, the pulse motor 26 is stopped (S3).

Figure 4:
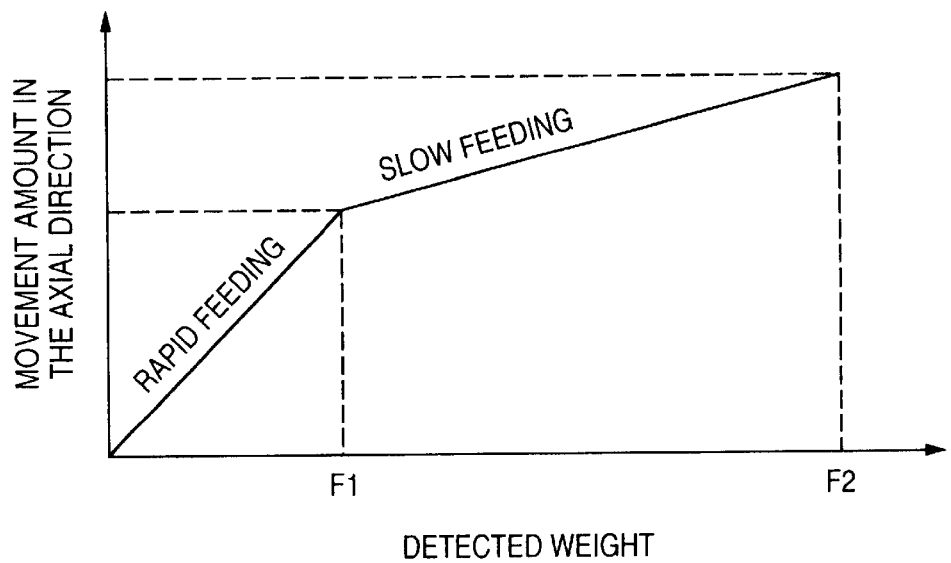
FIG. 4 is a graph showing a relationship of an axial weight and a movement amount of a feed shaft.

Thus, the feeding speed of the pulse motor 26 is set to two stages as shown in FIG. 4. The pulse motor feeds at the rapid feeding mode until the first setting weight F1 is detected. As the weight F1 is detected, the pulse motor is switched to the slow feeding mode until the weight F2 is detected.

After the second setting weight F2 is reached and the pulse motor 26 is stopped by a stop signal, the CPU 33 applies the swept sin wave onto the piezoelectric elements 22 and 23 using this stop signal as the trigger signal. Accordingly, the piezoelectric elements 22 and 23 generate vibration. This vibration is transmitted to the shaft 12, and the rolling bearing 10 is vibrated (S4). Thereby, after the stop of the pulse motor 26, the vibration can be loaded onto the rolling bearing at once, and simple and smooth automatic processing can be realized.

Next, a process to obtain the preloaded amount of the rolling bearing and its calculation principle will be described.

Generally, the resonance frequency f which acts on the rolling bearing while receiving the vibration, is expressed by the following equation (1).

$$f = \frac{1}{2\pi}\sqrt{\frac{K}{m}} \quad (1)$$

Herein, m is the mass of the bearing, and K is a rigidity of the bearing.

When the resonance frequency measured when the second setting weight F2 is loaded onto the bearing, is $f_m$, a true (at the initial condition) resonance frequency $f_a$ in which the weight is not loaded, is obtained by subtracting the frequency component for the weight F2 from the resonance frequency $f_M$. Accordingly, the resonance frequency $f_a$ can be expressed in an equation (2) as follows:

$$f_A = f_M - F2 \times kc \quad (2)$$

Herein, kc is a previously obtained correction coefficient [Hz/kgf]. The resonance frequency $f_a$ obtained by the above equation (2) is substituted into the equation (1) and the rigidity K is obtained. Then the true preload $F_a$ is obtained from the equation (3) using the obtained K.

$$F_a = \alpha \cdot f(K) \quad (3)$$

Figure 5:
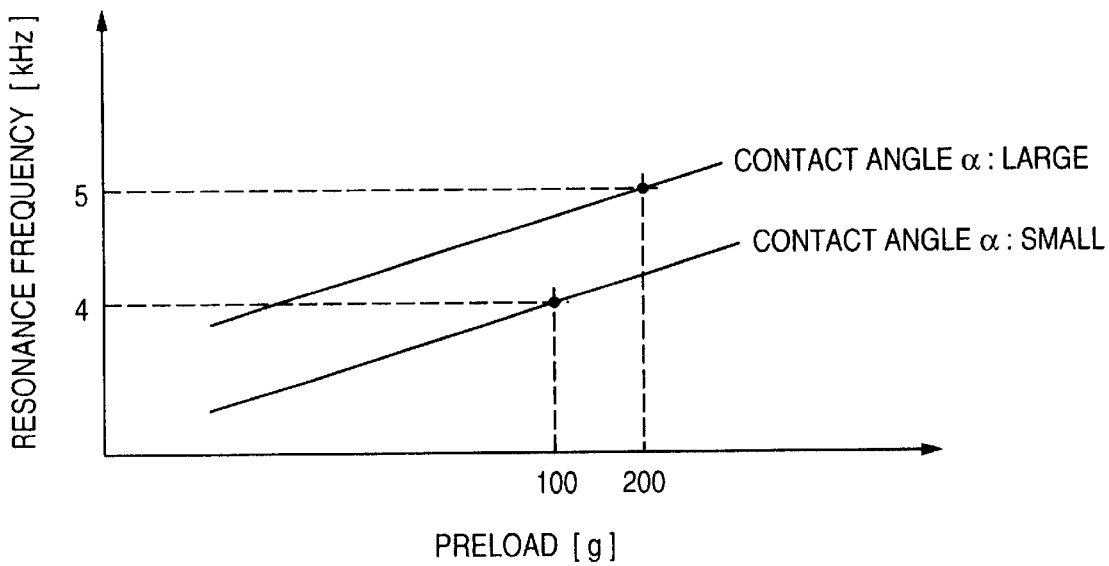
FIG. 5 is a graph showing a relationship of the preload and a resonance frequency according to the difference of an contact angle of the bearing.

Herein, α is a contact angle of the bearing and a known value. As shown in FIG. 5, a relationship between the resonance frequency and the preload changes corresponding to the magnitude of the contact angle α. That is, when the contact angle α is large (in other words, the radial gap is large), the resonance frequency is higher than the case where the contact angle α is small (in other words, the radial gap is small), even when the preload is the same.

To be obtained the above described true preload $F_a$ by the control section 30, initially, the resonance frequency $f_M$ is obtained (S5), when the vibration is applied by the piezoelectric elements 22 and 23.

Concretely, after the high frequency component is removed from the signal from the vibration sensor 29 by low pass filter 37, the signal is amplified by the amplifier 38, and further, sampled by an A/D converter 39. Thereby, for example, 1024 digital data is generated. Then FFT processing is conducted to this digital data, therefore, the power spectrum is obtained. The maximum frequency component of this power spectrum is defined as the resonance frequency $f_M$. Next, the true resonance frequency $f_a$ is obtained from the obtained resonance frequency $f_M$ and the weight F2 detected by the load cell 21, by using the equation (2) (S6).

Then, the true preload $F_a$ is obtained from the true resonance frequency $f_a$, the rigidity K of the bearing, and the contact angle α of the bearing, by using the equation (3). (S7)

Such the calculation processing is automatically conducted by previously storing the program in the control section 30, and then conducting the calculation according to the measuring data read from each unit by a command from the CPU 33. In this case, the calculation result is successively displayed on the display 41, and the judgement of good or bad or the information serving for each condition setting in the production process, can be clearly and rapidly presented to the operator of the preload measuring apparatus 100.

After that, one cycle of the measurement is completed by a series of returning operation (S9) such as the data storing, stop of the drive of piezoelectric elements 22, 23, and the weight removing by the reversal rotation of the pulse motor 26. Then the apparatus stands by for the next measurement.

As described above, according to the present embodiment, the generation of the noise vibration due to the disturbance such as the back rush or the like can be prevented by obtaining the resonance frequency under the condition that the weight is applied on the bearing, and converting the preload from the obtained resonance frequency. Accordingly, the highly accurate preload measurement can be conducted.

Further, the measurement can be carried out at once after the weight reaches the weight F2 by using the second setting weight F2 to measure the resonance frequency as the trigger signal. Accordingly, the measurement can be continuously conducted, the automatic measurement becomes easy, and the measurement with the high productivity can be conducted.

Next, referring to FIGS. 6–9, a second embodiment of the present embodiment will be described. Incidentally, in each drawing, the same portion as the first embodiment is denoted by the same code and the explanation will be omitted, and only different portions will be described by using different codes.

A preload measuring apparatus of the second embodiment can carry out the high accurate preload measurement to the small rolling bearing. When the mass of the bearing is small, the resonance frequency appears in the high frequency area side in which noise level is high, and S/N ratio of the resonance frequency to be detected is worse. Therefore, in the present embodiment, a weight member having the tapered inner diameter which fits into the outer peripheral portion of the outer ring, is added to the rolling bearing, thereby, the resonance point is shifted to the low frequency side, and then the lowering of the detection accuracy of the resonance frequency is prevented. The vibration sensor brings the probe in contact with this weight member, not with the outer ring of the rolling bearing, to carry out the measurement. However the other structure of the preload measuring apparatus is almost the same as in the first embodiment.

Initially, a reason why the weight member is added to the rolling bearing at the time of the preload measurement, will be described.

Figure 6:
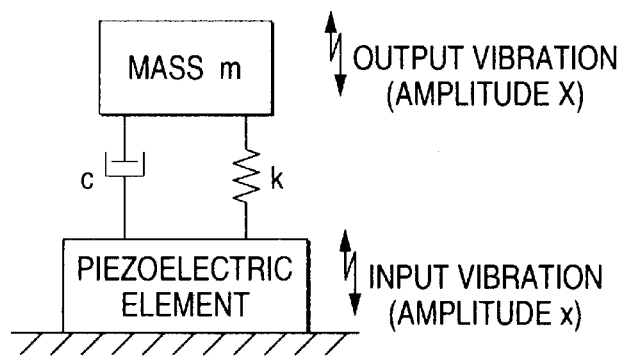
FIG. 6 is a view of the basic dynamic model explaining a relationship of the vibration of a piezoelectric element and the vibration in axial direction of the rolling bearing.
Figure 7:
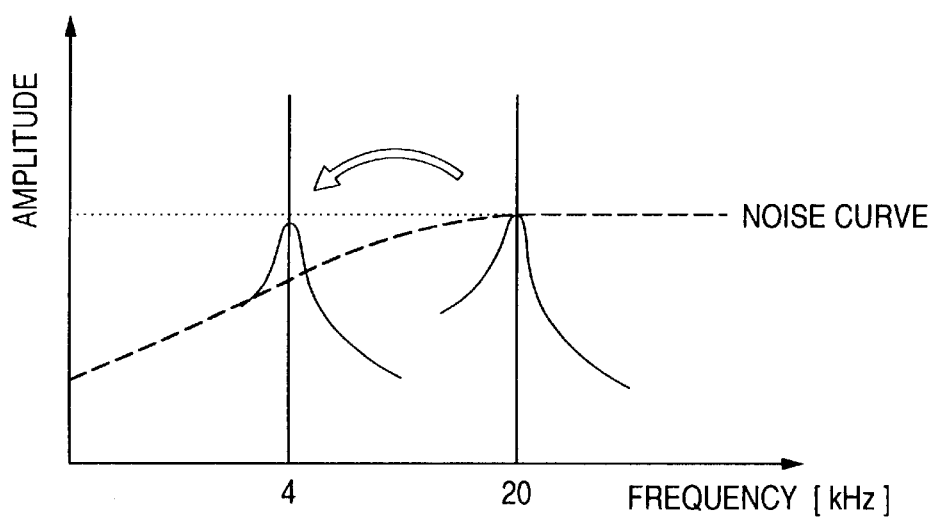
FIG. 7 is an illustration showing a power spectrum of the bearing vibration in a second embodiment of the present invention.

As shown in FIG. 6, When the amplitude on the input side is x and the amplitude on the output side is X, an amplitude ratio is expressed by the following equation (4).

$$\frac{X}{x} = \frac{1}{2\zeta\sqrt{1-\zeta^2}} \quad (4)$$

Herein, $\zeta$ is expressed in an equation (5) as follows.

$$\zeta = \frac{C}{2\sqrt{mK}} \quad (5)$$

When $\zeta$ is small, the following equation (6) is obtained.

$$\frac{X}{x} \cong \frac{1}{2\zeta} = \frac{\sqrt{mK}}{C} \quad (6)$$

Accordingly, when the spring constant K, and the attenuation coefficient C are constant, the following equation (7) is obtained.

$$\frac{X}{x} \propto \sqrt{m} \quad (7)$$

That is, if the mass becomes "a" times, the amplitude becomes $\sqrt{a}$ times. Further, the following equations (8) and (9) exist between the resonance frequency f and the mass m.

$$f = \frac{1}{2\pi}\sqrt{\frac{k}{m}} \quad (8)$$

$$f \propto \sqrt{\frac{1}{m}} \quad (9)$$

That is, when the mass becomes "a" times, the resonance frequency becomes $$\frac{1}{\sqrt{a}}$$

times.

As can clearly be seen from the equation, the resonance frequency of the rolling bearing having the small mass appears on the high frequency side. As shown in a relationship between the frequency and the amplitude in FIG. 7, for. example, when the resonance frequency generates in the vicinity of 20 kHz in which the noise level is large, it is becomes insufficient to separate of the noise from the frequency component of the bearing vibration. Therefore, the resonance frequency can not be accurately obtained.

On the one hand, when the mass is increased, and thereby, the resonance frequency is shifted to the low frequency side in the vicinity of, for example, 4 kHz in which the noise level is relatively small, the influence due to the noise is decreased, and the resonance frequency can be obtained under the condition that the S/N ratio is large. Therefore, the measuring accuracy is increased.

Figure 8:
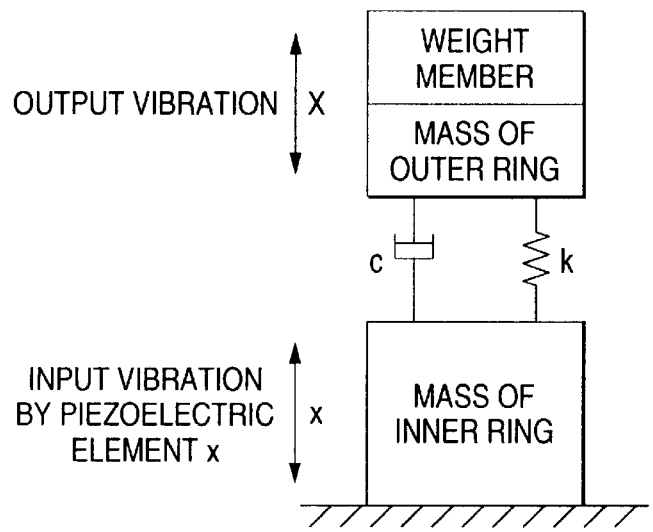
FIG. 8 is a view showing the dynamic model when a weight member is added to an outer ring in the second embodiment of the present invention.

Accordingly, in order to increase the mass of the rolling bearing, as shown in a dynamic model in FIG. 8, the weight member is added to, for example, the outer ring. Therefore, the mass m of the overall bearing can be increased. Thereby, the resonance frequency f is shifted to the low frequency area side.

Figure 9:
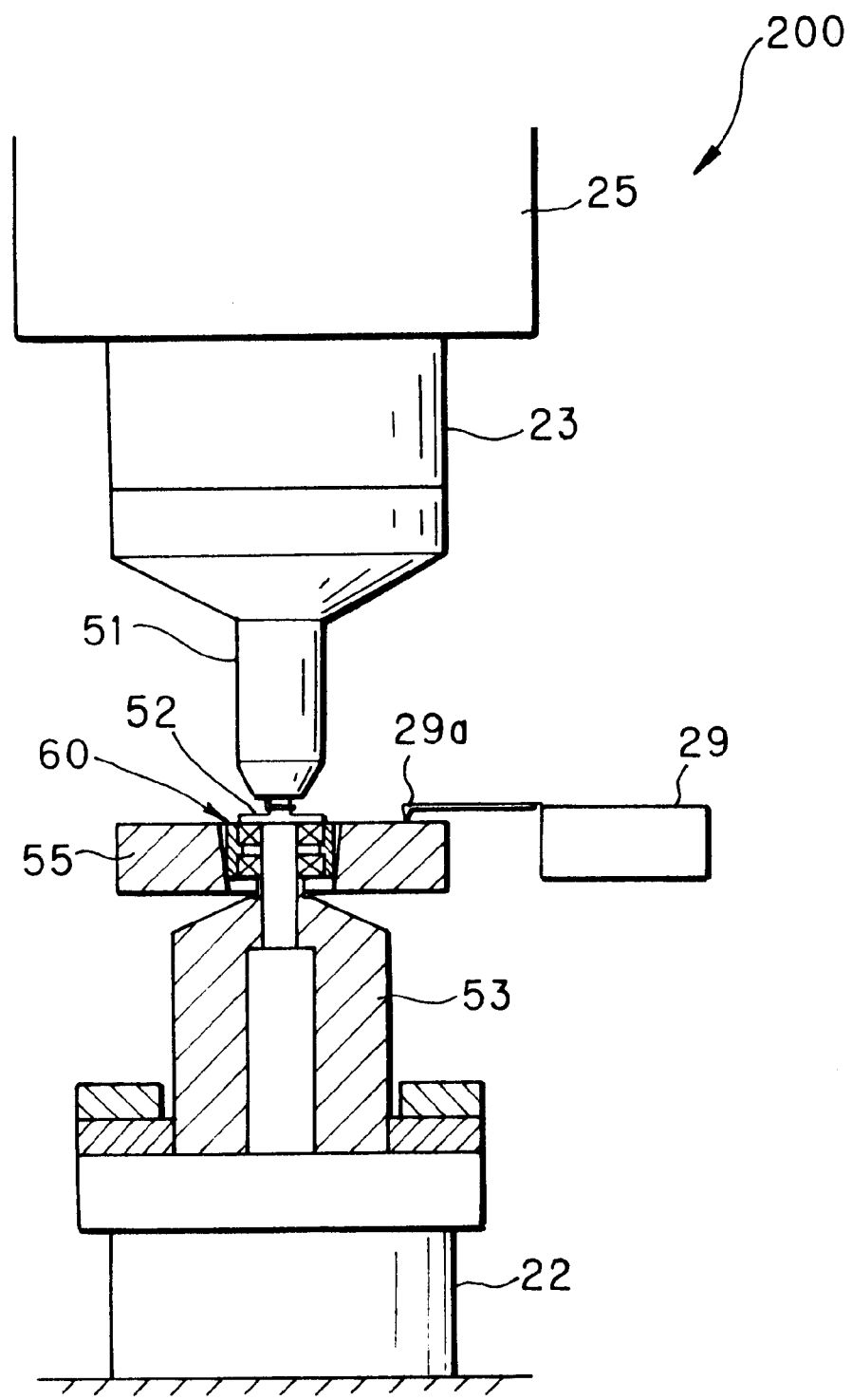
FIG. 9 is a view showing a second embodiment of a concrete structure according to the present invention.

As the concrete structure of the dynamic model, as shown by the structure of the main portion of the preload measuring apparatus 200 of the present embodiment in FIG. 9, the rolling bearing 60 is held between piezoelectric elements 22 and 23 through the pressing side tool 51, a bearing fixing tool 52, and the receiving side tool 53. That is, the bearing fixing tool 52 is inserted into the inner ring of the rolling bearing 60, one end side of the rolling bearing is contacted with a collar portion of the bearing fixing tool 52, and the other end side of the rolling bearing 60 is contacted with the upper end portion of the receiving side tool 53. Thereby the rolling bearing 60 is held on the shaft line of the feed shaft 25.

Further, a ring-shaped weight member 55 is attached to the outer ring of the rolling bearing 60. The weight member 55 has a taper (for example 5° relative to the axial direction thereof) so that the outer peripheral portion of the outer ring just fits in the inner peripheral surface of the weight member. The probe 29a of the vibration sensor 29 is contacted with for example, the upper surface of the weight member 55 for the detection of the vibration. Incidentally, as the direction of the taper, as shown in the drawing, the taper may expand to the upward direction, or reversely, expand to the downward direction. In any direction, it maybe allowable if the trouble is not generated for the pick-up of the vibration sensor 29.

It can also be considered that the vibration sensor 29 larger than that shown in the drawing is actually used, however, the degree of freedom of setting is enhanced by the down sizing of the shaft of the pressing side tool 51, and the degree of freedom of the vibration measuring position is also increased.

The other stricture of preload measuring apparatus 200 is the same as the preload measuring apparatus 100 of the first embodiment, and the process of the preload measurement is also the same as described above. Incidentally, the pressing pressure by the feed shaft 25 may be neglected, because the weight in the axial direction is loaded onto the bearing by the weight member.

In the preload measuring apparatus of the present embodiment, even when the size of the rolling bearing is decreased, thereby, the mass of the bearing is decreased and the resonance frequency of the bearing is increased, the mass of overall bearing is increased by providing weight member on the outer ring, and thereby the resonance frequency is lowered. Accordingly, while the lowering of the measuring accuracy due to noises is being prevented, the vibration peak of the resonance frequency can be stably, highly and accurately detected.

Next, referring to FIG. 10, the third embodiment of the present invention will be described. In the present embodiment, the preload measuring apparatus is shown, which is applied to the production apparatus of the rolling bearing. Incidentally, in also the present embodiment, the common portion to the first embodiment is denoted by the common code, and its explanation is omitted.

Figure 10:
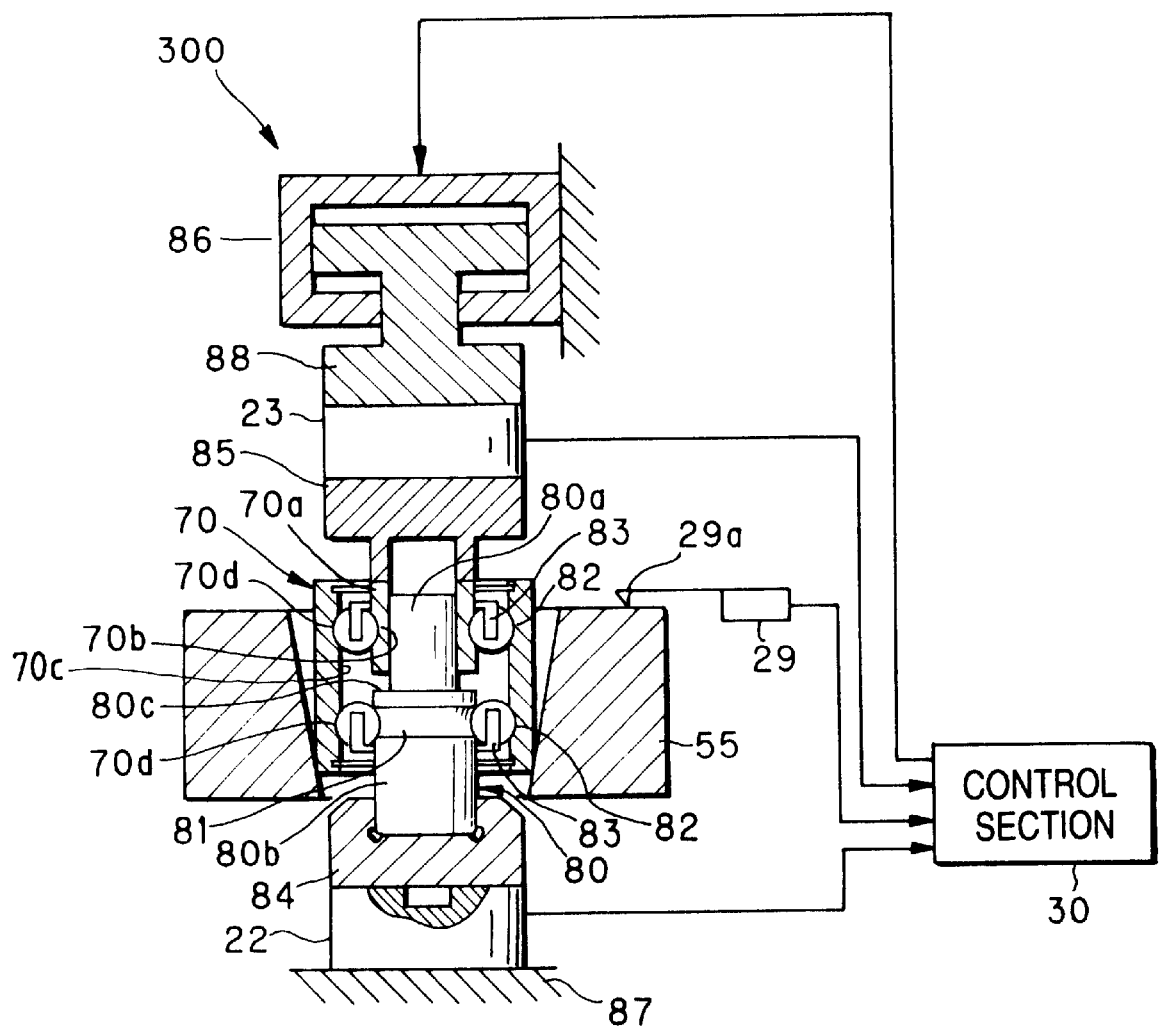
FIG. 10 is a view explaining a production method of the rolling bearing in the third embodiment of the present invention.

FIG. 10 shows main structure of the production apparatus of the rolling bearing comprising the preload measuring apparatus 300 of the present embodiment.

In a shaft 80 which is the first member, its small peripheral portion 80*a* and a large peripheral portion 80*b* are connected by a stage portion 80*c*. On the outer peripheral surface of the large peripheral portion 80*b* which is the first peripheral surface, the first deep-slot type inner ring raceway 81, which is the first raceway, is formed. Further, an inner ring 70*a*, which is the third member, has a little smaller diameter than the outer diameter of the small peripheral portion 80*a* in the free condition. This inner ring 70*a* forms the second deep-slot type inner raceway 70*b*, which is the fourth raceway, on the outer peripheral surface which is the third peripheral surface.

Further, in the inner peripheral surface, which is the second peripheral surface, of the outer ring 70*c* which is the second member, deep-slot type outer ring raceways 70*d*, 70*d*, which are the second and the third raceways, are formed. The weight member 55 is fixed on the outer peripheral surface of the outer ring 70*c*, and the tapered inner peripheral surface of the weight member 55 is engaged with the outer peripheral surface of the outer ring 70*c*.

Such the shaft 80, inner ring 70*a* and the outer ring 70*c* are assembled such that the inner ring 70*a* is engaged with the outside of the shaft 80, and the balls 82, 82 are arranged among the first and second inner ring raceways 81, 70*b*, and both outer ring raceways 70*d*, 70*d*. The balls 82, 82 are held by the holder 83. In this assembling time, the preload is not yet applied onto the balls 82 and 82.

After each member of the structure has been assembled, the shaft 80 is engaged with the receiving side tool 84, and the leading edge of the pressing side tool 65 is struck against the end surface of the inner ring 70*a*. By narrowing the gap between the receiving side tool 84 and the pressing side tool 85 by a push-in apparatus 86, the inner ring 70*a* is pushed in outside the small peripheral portion 80*a* of the shaft 80, and thereby, the preload is applied onto balls 82 and 82.

The piezoelectric elements 22 and 23 are respectively held between the receiving side tool 84 and the base board 87, and between the pushing side tool 85 and a push-in arm 88. These piezoelectric elements 22 and 23 have the sufficient rigidity along in the push-in direction of the inner ring 70*a* (the vertical direction in FIG. 10). These piezoelectric elements 22 and 23 are driven corresponding to the signal amplified by the power amplifier 35, which is amplified the oscillated signal from the swept sin oscillator 34 of the control section 30 shown in FIG. 2.

In the embodiment shown in the drawing, the above described control. section 30 outputs the signal for the resonance frequency detection of the rolling bearing, and the signal for the force necessary for pushing in the inner ring 70*a* onto the small peripheral portion 80*a*, that is, the signal for decreasing the stick slip. The pair of piezoelectric elements 22 and 23 are driven in the opposite phases, and with the same amplitudes. That is why it is prevented that the inner ring 70*a* is pushed in onto the small peripheral portion 80*a* accompanied by the vibration of the rolling bearing by both piezoelectric elements 22 and 23 (both piezoelectric elements 22 and 23 are simultaneously elongated, thereby, the pushing-in operation is conducted), and thereby, the shaft 80 and the inner ring 70*a* are sufficiently vibrated in the axial direction.

On the one hand, the probe 29*a* of the vibration sensor 29 is contacted with the end surface of the weight member 55, and the output from the sensor 29 is inputted into the control section 30. The control section 30 regulates the displacement amount of the push-in arm 88 by the push-in apparatus 86.

At the time of production of the rolling bearing, when the inner ring 70*a* is pushed in onto the small peripheral portion 80*a*, and an appropriate preload is applied onto each of balls 82 and 82, as disclosed in Japanese Patent Examined Publication No. Hei. 6-344233. It discloses that while the resonance frequency of the rolling bearing is being measured by the vibration sensor 29 in the same manner as in the first embodiment, the pressure oil is fed in the push-in apparatus 86, and the inner ring 70*a* is fitted in and engaged with the small peripheral portion 80*a* of the shaft 80 by pressing the inner ring 70*a* by the push-in arm 88. Then, when the above described resonance frequency almost coincides with the predetermined frequency, the feeding of the pressure oil in the push-in apparatus 86 is stopped, and the fitting-in operation is completed. Thus, the rolling bearing onto which an appropriate preload is applied, is completed.

Incidentally, in each of embodiments, the preload is measured by loading the weight onto the inner ring side, and measuring the resonance frequency of the outer ring side, however, the reverse structure in which the weight is loaded onto the outer ring side and the resonance frequency of the inner ring side is measured, may also be allowable.

As described above, in the preload measuring apparatus of the rolling bearing of the present invention, the vibration is provided under the condition that a predetermined weight is loaded onto the bearing, thereby, the vibration generated in the rolling bearing can be detected while the noise components are being removed. Accordingly, the resonance frequency of the rolling bearing can be accurately obtained. As the result, the true preload of the rolling bearing can be accurately obtained by the conversion processing. Further, the measurement of the preload can be rapidly conducted by the continuous automatic control, and the measurement with the high productivity can be conducted.

Further, when the weight member is fixedly provided onto the rolling bearing, it is prevented that the detection accuracy of the resonance frequency is lowered accompanied by the down sizing of the bearing, and the measurement of the preload can be highly accurately conducted.

The foregoing detailed description of the present invention is provided for the purpose of illustration and is not intended to be exhaustive or to limit the invention to the precise embodiment disclosed. Accordingly, the scope of the present invention is defined by the appended claims.

What is claimed is:

1. A preload measuring apparatus for measuring a preload of a rolling bearing which includes an inner race member, an outer race member, and a plurality of rolling elements rotatably interposed between said inner race member and said outer race member, said preload measuring apparatus comprising:

a bearing support member supporting both ends of said inner race member in the axial direction of said rolling bearing;

a pressurization member loading a predetermined load to one of said both ends of said inner race member in the axial direction through said bearing support member;

an excitation member applying a vibration to said inner race member in the axial direction while said predetermined load is loaded on said inner race member by said pressurization member;

a vibration sensor detecting a vibration which is generated on said outer race member and is caused by the vibration of said inner race member; and a controller capable of calculating a resonance frequency of said rolling bearing through an output signal of said vibration sensor and also calculating a true preload of said rolling bearing in accordance with the thus calculated resonance frequency, said true preload defining a preload of said rolling bearing before the predetermined load is loaded on said inner race member.

2. The preload measuring apparatus according to claim 1, wherein said inner race member comprises an inner ring and a shaft rigidly secured to said inner ring, and said bearing support member supports both ends of said shaft in the axial direction.

3. The preload measuring apparatus according to claim 1, wherein said inner race member comprises an inner ring and a shaft rigidly secured to said inner ring, and said bearing support member supports one end of said shaft in the axial direction and one end surface of said inner ring in the axial direction.

4. The preload measuring apparatus according to claim 1, wherein said inner race member comprises a shaft having a raceway on its peripheral surface.

5. The preload measuring apparatus according to claim 1, further comprising:

a pressurization detect member detecting a pressure of said inner race member which is loaded by the pressurization member;

wherein when an output of said pressurization detect member reaches a predetermined value, said excitation member begins to apply said vibration to said inner race member.

6. The preload measuring apparatus according to claim 1, wherein said excitation member comprises:

at least two piezoelectric elements applying vibration to said inner race member while loading said predetermined load on said inner race member in the axial direction, said piezoelectric elements having reverse phases and the same amplitudes with respect to each other.

7. The preload measuring apparatus according to claim 1, further comprises:

a weight member attached to the outer race member, wherein said vibration sensor detects said vibration of outer race member through said weight member.

8. The preload measuring apparatus according to claim 1, wherein the loading operation of said pressurization member is stopped when a resonance frequency output from the vibration sensor coincides with a predetermined frequency.

9. The preload measuring apparatus according to claim 5, wherein the loading operation of said pressurization member is stopped when a resonance frequency output from the vibration sensor coincides with a predetermined frequency.

10. The preload measuring apparatus according to claim 1, wherein said inner race member comprises an inner ring having at least one end surface in the axial direction to which said predetermined load of said pressurization member is loaded.

11. The preload measuring apparatus according to claim 2, wherein said inner ring has at least one end surface in the axial direction to which said predetermined load of said pressurization member is loaded.

12. The preload measuring apparatus according to claim 3, wherein said inner ring has at least one end surface in the axial direction to which said predetermined load of said pressurization member is loaded.

13. The preload measuring apparatus according to claim 7, wherein said inner race member comprises an inner ring having at least one end surface in the axial direction to which said predetermined load of said pressurization member is loaded.

14. The preload measuring apparatus according to claim 1, wherein the vibration applied by said excitation member to said inner race member in the axial direction is a vibration which has a region including a resonance frequency of the rolling bearing.

* * * * *